UNITED STATES PATENT OFFICE.

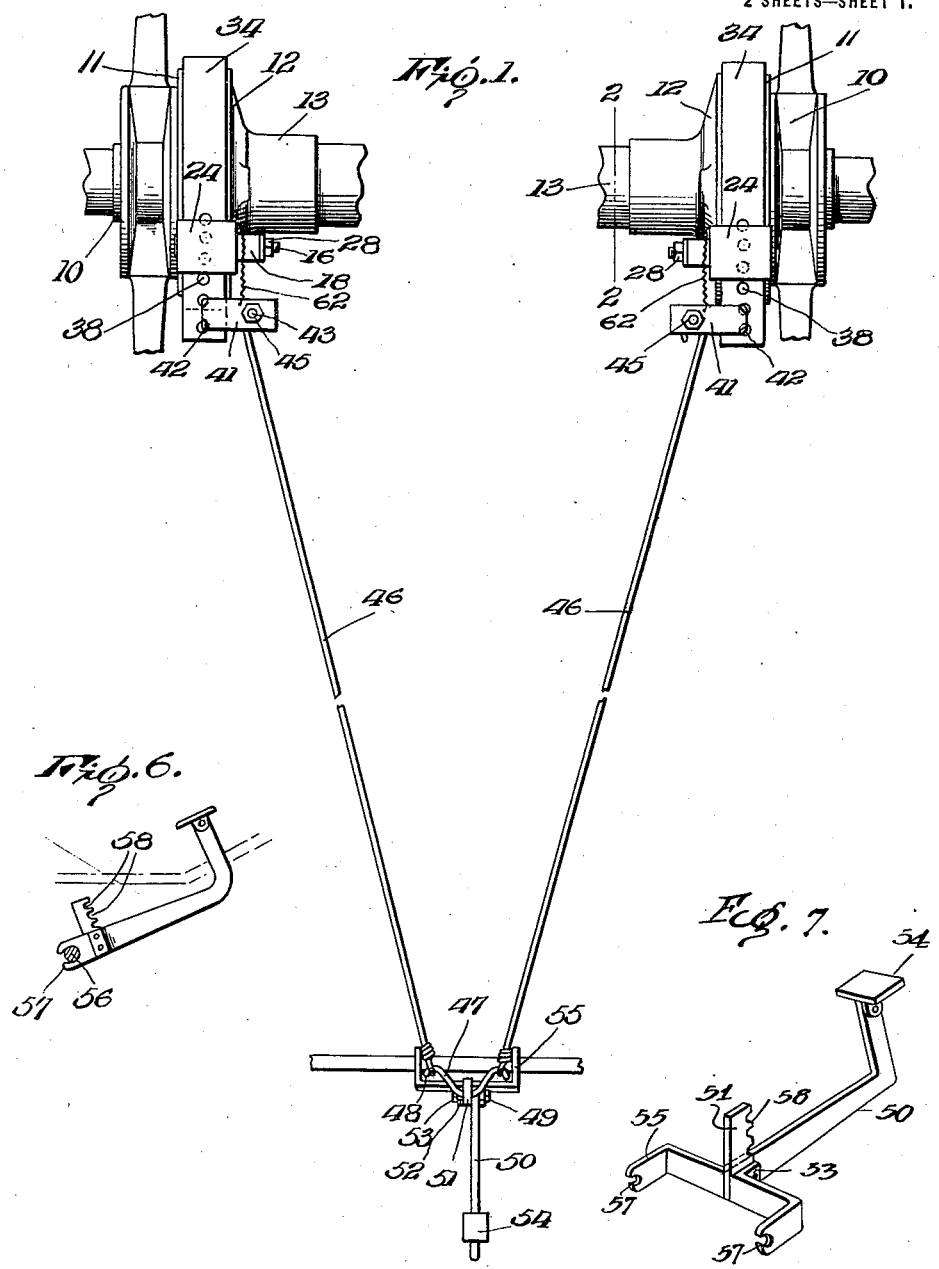

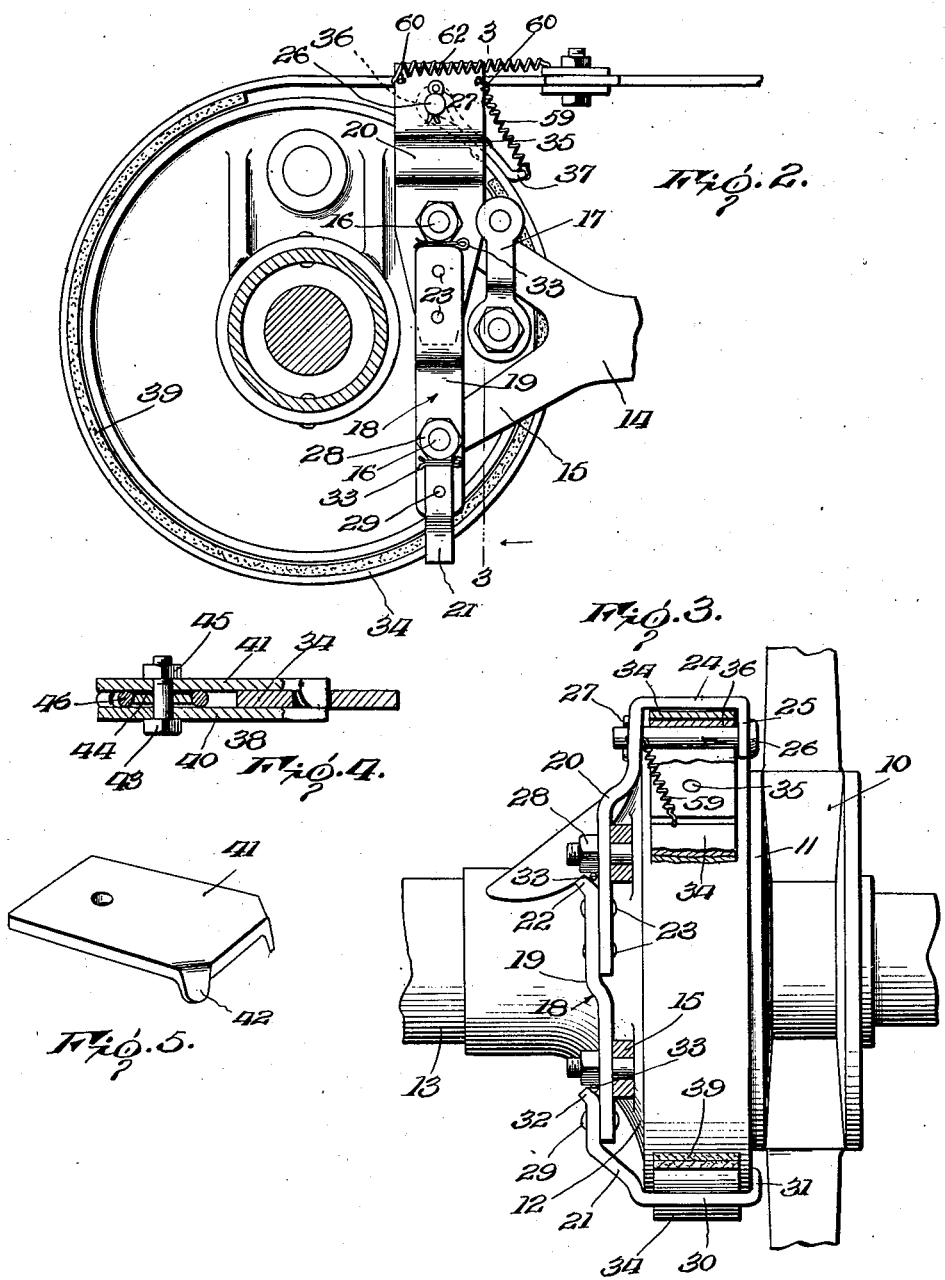

JOSEPH O. MICHAUD, OF FORT KENT, MAINE.

AUXILIARY BRAKE FOR AUTOMOBILES.

1,265,938.  Specification of Letters Patent.  Patented May 14, 1918.

Application filed March 26, 1917. Serial No. 157,441.

*To all whom it may concern:*

Be it known that I, JOSEPH O. MICHAUD, a citizen of the United States, residing at Fort Kent, in the county of Aroostook and State of Maine, have invented certain new and useful Improvements in Auxiliary Brakes for Automobiles, of which the following is a specification.

My invention relates to new and useful improvements in auxiliary brakes for Ford automobiles, the primary object of my invention being to insure absolute safety in the operation of the car, my auxiliary brake being designed particularly to accomplish this purpose.

More specifically, my invention has for one of its objects the provision of auxiliary brake bands adapted to be mounted to operate upon the outer faces of the brake drums of the rear wheels without necessitating the removal of any of the parts or without in any way interfering with the brakes now employed. By this means, when my brakes are employed all strain is taken off the rear axle and differential and all chattering and grinding as the vehicle is brought to a stop is prevented.

Another object which I have in view is to improve and simplify the auxiliary brake structure disclosed in a co-pending application filed by me February 3, 1917, and bearing the Serial No. 146,481.

The aim of my present invention is the improvement of the above referred to structure by simplifying the manner of mounting the brake bands about the drums and the means by which the brake bands may be tightened to apply the brakes.

With these and other objects in view, my invention will be more fully described, illustrated in the accompanying drawings, and then specifically pointed out in the claims which are attached to and form a part of this application.

In the drawings:

Figure 1 is a fragmentary plan view of my auxiliary brakes applied;

Fig. 2 is a section taken on the line 2—2 of Fig. 1, looking in the direction of the arrows;

Fig. 3 is a section on the line 3—3 of Fig. 2, looking in the direction of the arrows;

Fig. 4 is a fragmentary transverse section taken through the connection between one of the brake bands and the operating cable or wire;

Fig. 5 is a perspective view of one of the clamping plates employed as part of this fastening means;

Fig. 6 is a side elevation of the brake pedal and its manner of mounting.

Fig. 7 is a fragmentary view showing the manner of connecting a foot pedal to the hand lever controller shaft.

Corresponding and like parts are referred to in the following description and indicated in all the views of the drawings by the same reference characters.

In order to insure a clear and accurate understanding of my invention, I have illustrated it in connection with a pair of conventional Ford automobile wheels 10 having the usual brake drums 11, the inner faces of which are closed by brake band housings 12 upon the ends of the rear axle housing tube 13, rear radius rods 14 having fork terminals 15 secured to the brake drum housing by means of radius rod bolts 16, in the usual manner. It will be understood that the usual internal brake shoes coöperating with the brake drums are in no way interfered with, one hub brake cam lever 17 being shown in Fig. 2, although the drawings do not show the means for operating these internal brakes as they form no part of this invention.

My invention resides in the provision of an additional brake of the contracting band type which may be readily applied about the brake drums without removal of any of the regular automobile parts and without interfering with the employment and operation of the usual brakes. In carrying out this invention, I provide a pair of supporting brackets, each indicated as a whole by the numeral 18 and each being capable of being secured to either brake drum housing by the same bolts 16 which connect the radius rod thereto. Each of these brackets 18 includes an intermediate section 19, upper section 20 and lower section 21. The intermediate section is in the form of a rectangular strip of metal, the upper portion of which is outbent somewhat and the upper end of which is provided with an outwardly directed terminal or nose 22. The upper section 20 is preferably somewhat wider than the section 18 and has its lower end seated against that face of the section 19 adjacent the brake drum housing and secured thereto by rivets 23. This section 20 is laterally bent slightly adjacent the upper portion of the brake drum and its terminal is bent outwardly to extend in parallel spaced relation above the brake drum, as shown at 24, and downwardly, as shown at 25, to project a slight distance between the outer side of the brake drum and the spokes of the wheel 10. A clevis pin 26 is passed through this downbent portion and through the opposite portion of the section 20 and secured by a cotter pin 27 to provide with the portion 24 of the section 20 a guideway substantially rectangular in section. One of the bolts 16 passes through the section 20 adjacent the upper terminal of the upper section 19 and the other through the lower portion of the section 19 so that the nuts 28 threaded upon the bolts 16 will serve to secure the bracket in place. The lower section 21 is secured by a rivet 29 to the lower portion of the section 19 and is bent outwardly toward the brake drum and then beneath the brake drum, as shown at 30, extending in spaced relation to the brake drum and having an upwardly directed terminal 31 projecting between the brake drum and wheel spokes. The upper end of the section 21 is formed with an outbent terminal 32 corresponding to the terminal 22 of the section 19 and cotter pins 33 are passed between the terminals 22 and 32 and the adjacent nuts 28 to lock the nuts against turning movement after the bracket has been secured in place.

Coöperating with each brake drum and bracket 18 is a resilient brake band 34, one end of which is bent upon itself and secured by a rivet 35 to provide an eye 36 encircling the clevis pin 26, this rebent end having an outwardly directed terminal 37 formed with an opening for a reason which will be later explained. The opposite end of the brake band is passed downwardly and rearwardly about the brake drum and upwardly and forwardly through the space between the portion 24 of the bracket section 20 and the clevis pin 26 and, as best shown in Fig. 1, extends forwardly a slight distance, being formed with a series of spaced longitudinally alined openings 38. Secured within each brake band is the usual brake lining 39 adapted, when the band is tightened, to engage the outer face of the brake drum.

A clamping plate 40 engages at one end against the lower face of the free end of each brake band and projects laterally inwardly of the vehicle. Coöperating with this is a second clamping plate 41 which engages against the upper face of the brake band and which, at its outer corners, has downbent prongs 42 which pass through a pair of adjacent openings 38. A bolt 43 is passed through the inner end portions of the clamping plates and through a washer 44 interposed between the plate and secured by a nut 45 so that the plates are firmly clamped to the band. Wires or cables 46 have their rear ends passed between the plates 40 and 41 and bent about the washer 44 and at their forward ends are secured to a balancer 47 which is substantially V-shaped with its terminals outbent to provide hooks 48 to receive the forward ends of the wires 46.

Bolts 49 are passed through a pedal shank 50, the lower end of a plate 51 and one end of a plate 52 and secured by nuts 53. The forward end of the pedal shank projects upwardly through the floor boards of the vehicle and carries a foot pedal 54 and its rear end is directed laterally and then rearwardly, as shown at 55, and notched to engage around the hand lever controller shaft 56 of the vehicle. The free end of the plate 52 is also bent laterally and rearwardly and similarly notched to engage around the shaft and the side portions formed by notching the rear end of the pedal shank and the plate 52 are instruck somewhat, as shown at 57 to prevent their disengagement from the shaft and still leave the pedal free for swinging movement thereabout. The forward edge of the plate 51 is formed with a series of spaced notches 58 adapted to seat the intermediate portion of the balancer 47.

Obviously, by pushing forward against the pedal 54, the brake pedal shank will be swung about the shaft 56 as a center and will draw upon the wires 46 to tighten the brake bands about the brake drums. Furthermore, adjustments for providing more or less leverage may be readily made by shifting the position of the balancing member 47 from one notch to another. Further adjustments may be had by varying the location of the clamping plates 40 and 41 upon the brake bands or by pulling the wire around the washers 44. Helical springs 59 each have one terminal hooked through the opening in the terminal 37 of one of the brake bands and its opposite terminal hooked through an opening 60 formed in the adjacent edge of the upper section 20 of the bracket 18. This section is provided adjacent each edge with one of the openings 60 so that the spring may be applied whether the bracket is upon the right or left brake drum housing. This spring, of course, acts to swing the forward portion of the brake band away from the brake drum when the band is released and, consequently, to prevent dragging of the brake band upon the drum. If desired, further helical springs 62 may be provided to insure proper release of the brake bands, each of these springs having one terminal hooked through an opening in one of the clamping plates 41 and the other through the remaining opening 60 of the bracket.

Although I have illustrated and described my invention in all its details of construction, it will of course be understood that I reserve the right to make any changes, within the scope of the appended claims, without in the slightest degree departing from the spirit of my invention.

Having thus described my invention, what is claimed as new is:

1. In a supplemental brake for automobiles, a bracket adapted to be secured to the brake drum housing by the bolts fastening the rear radius rod thereto and having its ends projecting above and below the brake drum and toward each other at the outer face of the drum, a pin passed through the upper portion of the bracket and adjacent terminal to provide a guideway, a brake band encircling the brake drum and having one end bent upon itself and secured to form an eye about the pin and its opposite end extended between the bracket and pin, a spring connected to the bracket and to the rebent terminal of the brake band to normally hold the brake band out of engagement with the drum, and means for tightening the brake band to bring it into engagement with the brake drum.

2. In a supplemental brake for automobiles, a pair of bracket sections secured to each other with the overlapping end of one section bent out from the other and with the free end of the other section bent laterally and downwardly to form a brake band guide, a further bracket section secured to the free end of the first section and bent upwardly and outwardly to form another guide, with its ends secured to the first section having an outwardly directed terminal, the first sections being formed with bolt receiving openings adjacent the outwardly directed terminals whereby cotter pins may be passed between such terminals and nuts threaded upon bolts passed through the openings to lock the nuts against turning movement, and a brake band supported by and guided in the bracket.

3. In a supplemental brake for automobiles, a bracket adapted for attachment to a brake drum housing, a brake band supported and guided by the bracket with one end fixed thereto and the other end movable therethrough and formed with alined openings, clamping plates engaging against opposite faces of such end, prongs formed on one of the clamping plates and projecting through adjacent openings, clamping means passed through the clamping plates at one side of the brake band to secure them to each other and to the brake band, a wire secured to the clamping means, and means for exerting strain upon the wire to tighten the brake band.

4. In a supplemental brake for automobiles, a bracket adapted to be secured to the brake drum housing and having ends projecting above and below the brake drum and toward each other at the outer face of the drum, a pin passed through the upper portion of the bracket and adjacent terminal to provide a guideway, a brake band encircling the brake drum and normally held out of engagement therewith, the said band having one end secured about the pin and the other end extended between the bracket and pin, and means for tightening the brake band to bring it into engagement with the drum.

In testimony whereof I affix my signature.

JOSEPH O. MICHAUD. [L. S.]